United States Patent Office 3,522,190
Patented July 28, 1970

3,522,190
PHOTOLUMINESCENT GLASSES
Warren H. Turner, Toledo, Ohio, and Marvin J. Albinak, Wheeling, W. Va., assignors to Owens-Illinois, Inc., a corporation of Ohio
No Drawing. Filed Dec. 20, 1966, Ser. No. 603,147
Int. Cl. C03c 3/04; C09k 1/54
U.S. Cl. 252—301.4                                          4 Claims

ABSTRACT OF THE DISCLOSURE

Luminescent glass compositions, particularly magnesia-alumina-silica glasses doped with samarium, in part reduced to the divalent state, producing the luminescence of $Sm^{+3}$ under one wave length of ultraviolet radiation, and by the presence of $Sm^{+2}$ providing a bright blue-to-yellow-green luminescence under another wave length of ultraviolet radition.

---

This invention relates to luminescent glass compositions and, more particularly, to brightly photoluminescent glass compositions having different colors of luminescence under different wave lengths of activating radiations. Further, the invention relates to photoluminescent glass compositions comprising samarium as the photoluminescent activator, and having the bright orange or orange-red luminescence of $Sm^{+3}$ under one wave length of ultraviolet radiation; and also, containing what is believed to be $Sm^{+2}$ and thereby having a bright blue-to-yellow-green luminescence under another wave length of ultraviolet radiation.

Further, the invention relates to a process for the preparation of "indicating" glasses having decided specificity to different wave lengths of exciting radiation, and which give very different colors in response to different wave lengths, and yet are bright under all conditions.

Luminescence is desirable as photon emission initiated by nonthermal energy forms. In order for a solid to be luminescent under excitation conditions, it must have a suitable arrangement and population of the electronic energy levels in its constituent atoms. With a suitable structural arrangement properly situated electrons are excited to higher energy levels under the influence of the excitation medium, and these electrons emit photons upon their spontaneous return from the higher energy level form to a lower energy level form.

THE PROBLEM

Luminescent materials, including phosphorescent and fluorescent materials, have found wide acceptance in the art for such uses as fluorescent lights and the like. The luminescent materials emit a radiation, for example visible radiation, on excitation with such energy forms as ultraviolet light and the like. Thus, they convert these invisible energy forms into visible light forms. Examples of such commercial luminophors are calcium tungstate, copper-activated zinc cadmium selenide, barium-lead sulfate, miscellaneous tungstates, and molybdates.

Typically, such prior art materials act as reflective coatings when placed upon the surface of a glass envelope within which ultraviolet activating rays are generated, as by mercury vapors, for the purpose of producing fluorescence. Therefore, these materials cannot be used to transmit desirable visible light produced directly, as from a high intensity ultraviolet gas source, due to their reflectivity and their opaque characteristics.

The further problem of phosphors, and also of prior art luminescent glasses for that matter, is that they have relatively poor radiation absorption characteristics and low luminescent outputs. Thus, fluorescent lighting tubes of modest power, typified by the present day fluorescent tubes in office and industry, generate relatively low levels of ultraviolet rays. If these rays could be more effectively absorbed, and thereby converted into visible light, more efficient use of the electrical input energy into the lamp or lighting device would be provided.

A further problem of phosphors of the prior art is that they are tremendously sensitive to impurities. Minute amounts of impurities cause the luminescence of phosphors to be substantially reduced. As a result, they are expensive to manufacture because of the care and precision required during their processing to both remove impurities and to keep impurities out. Expense also arises because of the precautions which must be exercised in handling these materials during use by the customer or tube manufacturer. The tube manufacturer coats the phosphor material, in the form of a slurry having a liquid carrier therein, onto for example the inner surface of a glass envelope, to produce a luminescent coating. If, at any point during this coating process, impurities are accidentally introduced into the phosphors, the luminescence is greatly reduced.

Also, luminescent materials of the prior art decay quite rapidly under high intensity bombardment, and are particularly sensitive to heat and radiation decay, and gradually lose their original brightness levels.

Luminescence in glass is, of course, known. However, it has always been a challenge to the art to produce photoluminescent glasses displaying extremely high levels of luminescent output brightness. In most instances, the output is so undesirably low that the glasses are not adapted to many practical applications as required for visual purposes.

Accordingly, it would provide a substantial advance to the art if ultraviolet ray-type luminescent devices could be made which convert a very high percentage of the activating energy into extremely bright luminescent visible output light.

Thus, if the glass envelope could be made unexpectedly luminescent in order to convert otherwise lost ultraviolet rays into visible light, and at the same time be sensitive to different colors of radiation, novel indicating devices could be provided.

In view of the foregoing, important objects of this invention are to provide a broad spectrum of "indicator" glasses.

A further object is to provide novel luminescent glass systems wherein the output color can be controlled in accordance with the method of manufacture of the glass.

A further object is to provide novel photoluminescent glass systems which are "indicating" glasses, having decided specificity to different wave lengths of exciting radiation, and which give very different colors, yet are bright under all conditions.

A further object is to provide a process for preparing glasses having varying colors of luminescent outputs with varying wave length excitation radiation.

Another important object of this invention is to provide a broad spectrum of luminescent glasses having good physical properties and that are adapted for use as envelopes as for mercury vapor lamps; and, that are also highly efficient for converting ultraviolet rays into visible illumination.

Other objects are to provide novel photoluminescent glasses having very bright outputs and improved characteristics as will become apparent from the following description.

THE PRESENT INVENTION

We have now found that both bright orange or orange-red photoluminescence and bright blue-to-yellow-green photoluminescence are obtainable with low amounts of samarium, in a broad spectrum of glasses. However, by the present invention, some of the samarium is present in the $Sm^{+3}$ state, and also part is believed to be present in the $Sm^{+2}$ state. These two forms account for the "selectivity" as well as the dual output of the novel glasses of the invention. These glasses are characterized by high transparency, extremely good resistance to deterioration and good workability. Further, these glasses have physical properties rendering them capable of incorporation into a wide range of products suitable for visual use.

By the present invention, the two valence states of samarium, e.g., $Sm^{+3}$ and $Sm^{+2}$ are derived by chemical or thermal reduction—or by other means, as will become apparent hereinafter.

Also, we have now developed a process for preparing "indicating" glasses having decided specificity to different wave lengths of exciting radiation and which give very different colors yet which are bright under all conditions.

Most photoluminescent glasses heretofore known produce the same color of luminescent output under the influence of any wave length of radiation; or give a certain color under one wave length and little of the same color or no luminescence at all under other exciting wave lengths.

A bright orange or orange-red output has been reported for samarium by many workers. This indicates that all of the samarium is present in the $Sm^{+3}$ state. We have found that by preparing a glass in accordance with this invention, we obtain the surprising result that, while retaining the $Sm^{+3}$ luminescence, a bright blue-to-yellow-green photoluminescence is also obtained. Further, this latter photoluminescence can be activated by the short wave ultraviolet lamp. $Sm^{+3}$ produces its orange photoluminescence by activation with the longer rays from an ultraviolet lamp.

Short wave and long wave designate the emissions obtained with typical commercially available low pressure mercury vapor lamps, which are filtered to isolate certain spectral lines. The short wave lamp emits large amounts of 2537 A. wave length ultraviolet, with lesser amounts of 3050 A. and 3660 A. Also, some 4050 A. and other visible lines "leak" through the filter to a small degree. The long wave lamp is filtered to produce the 3660 A. line, as well, a broad band emission is seen extending from 3200 A. to about 4000 A. No. 2537 A. or 3050 A. line is seen in this emission.

We therefore obtain, for example, a glass which is bright blue under short wave ultraviolet and a bright orange under long wave ultraviolet. Accordingly, by the present invention we have discovered "detecting" glasses which are capable of distinguishing long wave and short wave ultraviolet radiations.

A further discovery of the invention resides in changing, in a predictable fashion, the short wave activated photoluminescent output color from blue to green to yellow by altering the composition of the base glass in a controlled manner.

By the present invention, a wide range of glasses has been prepared, comprising samarium as the photoluminescent activator. These glasses include commercial glasses such as soda-lime-silica; barium crown; zinc crown; tubing glasses; borosilicate glasses; Cabal (alkali-free) glasses; magnesia-alumina-silica and other alumina-silica glasses; borate and boro-alumina glasses; phosphate glasses, etc.

It is not intended to limit this invention to any particular glass, but simply to cover the novel combinations of activator states in a broad spectrum of glasses.

The following examples typify glasses made in accordance with this invention. The compositional ranges are not to be considered limiting and further ramifications will be apparent to those skilled in the art, within the scope of the invention.

The various ramifications of the invention can be broken down into categories, based upon the susceptibility of a glass to activation by both states of the activator. The following description will highlight the various aspects and extended scope of the invention.

The results are based generally on raw data but there is a strong general correlation from one glass to another, even considering variables inherent in glass preparations and testing. The empirical trends are clearly apparent as follows:

(1) As a general proposition it can be stated that in low alkali glasses with less than 1% samarium we always obtain two colors of photoluminescent output. Alkali-free glasses are generally defined as having less than 5% $R_2O$ alkali, meaning alkali metal oxide.

(2) Further in high alkali glasses, if the glass is melted under a low partial pressure of oxygen, this effect is produced; or in the presence of chemical reductants this effect is produced; or still further, by melting the glass at a very high temperature, thermal reduction is effective to produce the desired results. For example, it has been found that in an electrically heated furnace, a 20% excess of oxygen in the atmosphere (air=20% oxygen) above the melt will nevertheless result in thermal reduction of some of the $Sm^{+3}$ to $Sm^{+2}$ if the melting temperature is held at about 2900° F.

Also, in a gas-fired furnace, a 1%–2% dificiency of air in the combustion atmosphere above the melt is effective to reduce some of the $Sm^{+3}$ to the $Sm^{+2}$ state. Still further, in a gas-fired furnace, a 1%–2% excess of air in the combustion atmosphere above the melt is effective to reduce some of the $Sm^{+3}$ to the $Sm^{+2}$ state, since this functions as a relatively reducing atmosphere.

TYPICAL PRIOR ART RESULTS

Example I

In this series of runs, several glasses were each melted separately in an electric furnace under oxidizing conditions, meaning 20% excess oxygen in the atmosphere above the melt. The atmosphere was air. To each melt was added 0.25% $Sm_2O_3$. The melting conditions were effective to retain the $Sm_2O_3$ in the $Sm^{+3}$ state, in accordance with the observations of the prior art.

Luminescent output results are set forth in summary form in the following table:

| Glass No. | Composition | Percent $Sm_2O_3$ | Short wave UV | Long wave UV |
|---|---|---|---|---|
| 1 | $Na_2O \cdot 2\ SiO_2$ | 0.25 | Nil | Orange. |
| 2 | $Na_2O \cdot 3\ SiO_2$ | 0.25 | do | Do. |
| 3 | $Na_2O \cdot 4\ SiO_2$ | 0.25 | do | Do. |
| 4 | $Na_2O \cdot 6\ SiO_2$ | 0.25 | do | Do. |
| 5 | $Na_2O \cdot 8\ SiO_2$ | 0.25 | do | Do. |
| 6 | TM5 [1] | 0.25 | do | Do. |
| 7 | TM7 [1] | 0.25 | do | Do. |
| 8 | $K_2O \cdot 4\ SiO_2$ | 0.25 | do | Do. |
| 9 | $Rb_2O \cdot 4\ SiO_2$ | 0.25 | do | Do. |
| 10 | $CsO_2 \cdot 4\ SiO_2$ | 0.25 | do | Do. |

[1] TM5 and TM7 glasses have the compositions listed below:

| | Percent | |
|---|---|---|
| | TM5 | TM7 |
| Ingredient: | | |
| $SiO_2$ | 66.78 | 67.5 |
| $Al_2O_3$ | 3.90 | 4.0 |
| CaO | .28 | 0.1 |
| MgO | .04 | |
| BaO | 11.08 | 12.1 |
| PbO | 2.40 | |
| $Na_2O$ | 6.88 | 7.9 |
| $K_2O$ | 6.93 | 6.7 |
| $Li_2O$ | | .57 |
| $Fe_2O_3$ | 0.07 | .06 |
| MnO | 0.05 | |
| $F_2$ | .94 | 1.14 |
| $-O_2$ | −.40 | −.48 |
| $As_2O_3$ | .11 | |
| $Sb_2O_3$ | .44 | |
| $Sm_2O_3$ | .25 | .25 |

THE NOVEL RESULTS OF THE PRESENT INVENTION

Example II.—Magnesia-alumina-silica glass

The base glass used in this run was a magnesia-aluminia-silica glass of the following typical composition:

| Ingredient: | Percent |
|---|---|
| SiO | 61.00 |
| $Al_2O_3$ | 18.50 |
| MgO | 20.50 |

The glass was melted in an electric furnace under oxidizing conditions, meaning 20% excess oxygen in the atmosphere above the melt. To the glass was added 0.05% $Sm_2O_3$. The glass was melted at a temperature of about 2900° F. which was effective to produce thermal reduction of some of the $Sm_2O_3$ to the $Sm^{+2}$ state. Luminescent output results are as follows:

| Short Wave Ultraviolet | Long Wave Ultraviolet |
|---|---|
| Blue | Orange |

This illustrates a principle of the invention that a low alkali glass will produce two colors of photo-luminescent output with less than 1% of samarium content.

Example III.—Soda-lime-silica glass

The base glass used in this series of runs was a soda-lime-silica glass of the following typical composition:

| Ingredient: | Percent |
|---|---|
| $SiO_2$ | 71.53 |
| $Al_2O_3$ | 1.43 |
| CaO | 11.10 |
| MgO | 2.70 |
| $Na_2O$ | 12.92 |
| $K_2O$ | .31 |

Each run of glass was melted in a gas-fired furnace under either fully reducing conditions, meaning 1%–2% deficiency of air in the combustion atmosphere above the melt; or, under relatively reducing conditions, meaning 1%–2% excess of air in the combustion atmosphere above the melt. To the batch was added $Sm_2O_3$ in varying amounts. The reducing conditions were effective in each run to reduce some of the $Sm_2O_3$ to $Sm^{+2}$. Luminescent output results are set forth in the following table:

| Glass No. | Melting atmosphere | Percent $Sm_2O_3$ | Short wave UV | Long wave UV |
|---|---|---|---|---|
| 1 | Reducing [1] | 0.05 | Green | Orange |
| 2 | Relatively reducing [2] | 0.05 | do | Do. |
| 3 [3] | Reducing | 0.25 | Pale green | Do. |
| 4 | do | 0.25 | do | Do. |
| 5 | Relatively reducing | 0.25 | Green | Do. |
| 6 [4] | do | 0.25 | do | Do. |
| 7 | do | 1.00 | do | Do. |
| 8 | Reducing | 3.00 | Yellow | Do. |

[1] 1%–2% deficiency of air in combustion atmosphere.
[2] 1%–2% excess of air in combustion atmosphere.
[3] Melted from commercial grade materials.
[4] Duplicate of 5, but made with different raw materials.

These runs illustrate a principle of the invention that a high alkali glass will produce two colors of photo-luminescent output when the glass is melted under a low partial pressure of oxygen.

Example IV.—Special soda-lime-silica glass plus graphite

The base glass used in this run was a soda-lime-silica glass initially containing 0.5% graphite for purposes of reducing the glass during the melting process. The glass had the following composition:

| Ingredient: | Percent |
|---|---|
| $SiO_2$ | 70.00 |
| CaO | 10.00 |
| $Na_2O$ | 20.00 |

The glass was melted in a gas-fired furnace at a temperature in the range of 2600° F. to 2700° F. To the batch was added 0.01% $Sm_2O_3$. The melting conditions were effective to reduce some of the $Sm_2O_3$ to the $Sm^{+2}$ state. Luminescent output results were as follows:

| Short Wave Ultraviolet | Long Wave Ultraviolet |
|---|---|
| Green | Pale Orange |

This run also illustrates a principle of the invention that a high alkali glass will produce two colors of photo-luminescent output when the glass is melted under the equivalent of a low partial pressure of oxygen.

Example V.—Zinc-soda-alumina-silica glass

The base glass used in this series of runs was a zinc-soda-alumina-silica glass of the following typical composition:

| Ingredient: | Percent |
|---|---|
| $SiO_2$ | 64.97 |
| $Al_2O_3$ | 9.19 |
| ZnO | 14.67 |
| $Na_2O$ | 11.17 |

Each run of glass was melted in an electrical furnace under reducing conditions, meaning reduced with graphite. To the batch was added varying amounts of $Sm_2O_3$. The reducing conditions were effective to reduce some of the $Sm_2O_3$ to the $Sm^{+2}$ state. Luminescent output results were as follows:

| Glass No. | Percent $Sm_2O_3$ | Short wave ultraviolet | Long wave ultraviolet |
|---|---|---|---|
| 1 | 0.25 | Green | Orange. |
| 2 | 1.00 | Pale green | Do. |

These runs illustrate a principle of the invention that a high alkali glass will produce two colors of photo-luminescent output when the glass is melted under the equivalent of a low partial pressure of oxygen.

Example VI.—Lithia-magnesia-alumina-silica glass

The base glass used in this series of runs was a lithia-magnesia-alumina-silica glass of the following typical composition:

| Ingredient: | Percent |
|---|---|
| $SiO_2$ | 57.96 |
| $Al_2O_3$ | 17.57 |
| MgO | 19.47 |
| $Li_2O$ | 5.00 |

The glass for each run was melted in an electric furnace under reducing conditions, meaning reduced with graphite; or in an electric furnace under oxidizing conditions, meaning 20% excess oxygen in the atmosphere above the melt.

To the batch in each run was added 0.25% $Sm_2O_3$. Luminescent output results were as follows:

| Glass No. | Added ingredient | Melting conditions | Short wave UV | Long wave UV |
|---|---|---|---|---|
| 1 | | Reducing | Blue | Orange |
| 2 | | Thermal reduction | Yellow | Do. |
| 3 | +5% PbO | do | Blue | Do. |

These runs illustrate a principle of the invention that a low alkali glass will produce two colors of photo-luminescent output with less than 1% of samarium content.

Example VII.—Soda-magnesia-alumina-silica glass

The base glass used in this run was a soda-magnesia-alumina-silica glass of the following typical composition:

| Ingredient: | Percent |
|---|---|
| $SiO_2$ | 57.96 |
| $Al_2O_3$ | 17.57 |
| MgO | 19.47 |
| $Na_2O$ | 5.00 |

The glass was melted in an electric furnace under oxidizing conditions, meaning 20% excess oxygen in the atmosphere above the melt. To the glass was added 0.25% $Sm_2O_3$. Because of the high temperature of the melt, 2900° F., the melting conditions, even through relatively oxidizing, were effective to reduce some of the $Sm_2O_3$ to $Sm^{+2}$ by thermal reduction. Luminescent output results were as follows:

| Short Wave Ultraviolet | Long Wave Ultraviolet |
|---|---|
| Blue | Orange |

This run illustrates a principle of the invention that a low alkali glass will produce two colors of photoluminescent output with less than 1% of samarium content.

Example VIII.—KG33 glass; borosilicate

The base glass used in this series of runs was a KG33 glass of the following typical composition:

| Ingredient: | Percent |
|---|---|
| $SiO_2$ | 76.36 |
| $Al_2O_3$ | 1.99 |
| $B_2O_3$ | 15.30 |
| $Na_2O$ | 6.35 |

The glass was melted in a gas-fired furnace under reducing conditions, meaning 1%–2% deficiency of air in the combustion atmosphere above the melt. To the batch was added 0.25% $Sm_2O_3$. The reducing conditions were effective to reduce some of the $Sm_2O_3$ to the $Sm^{+2}$ state. Luminescent output results were as follows:

| Short Wave Ultraviolet | Long Wave Ultraviolet |
|---|---|
| Green | Orange |

In another run, a batch of the above glass was also melted in an electric furnace under oxidizing conditions, meaning 20% excess oxygen in the atmosphere above the melt (air atmosphere). To the batch was added 0.25% $Sm_2O_3$. The high temperature of the melt (2900° F.) was effective to thermally reduce some of the $Sm_2O_3$ to $Sm^{+2}$. Luminescent output results were as follows:

| Short Wave Ultraviolet | Long Wave Ultraviolet |
|---|---|
| Blue-Green | Orange |

These runs illustrate a principle of the invention that a relatively low alkali glass will produce two colors of photoluminescent output with less than 1% of samarium content.

Example IX.—Barium crown glass

The base glass used in this series of runs was a barium crown glass of the following typical composition:

| Ingredient: | Percent |
|---|---|
| $SiO_2$ | 63.93 |
| $Al_2O_3$ | 1.55 |
| BaO | 17.28 |
| $Na_2O$ | 4.57 |
| $K_2O$ | 10.50 |
| $B_2O_3$ | 2.18 |

The glass was melted in a gas-fired furnace under reducing conditions, meaning 1%–2% deficiency of oxygen in the combustion atmosphere above the melt. To the batch was added varying amounts of $Sm_2O_3$. The reducing conditions were effective to reduce some of the $Sm_2O_3$ to the $Sm^{+2}$ state. Luminescent output results were as follows:

| Glass No. | Added ingredient | Percent $Sm_2O_3$ | Short wave ultraviolet | Long wave ultraviolet |
|---|---|---|---|---|
| 1 | | 0.25 | Faint blue-green | Orange. |
| 2 | | 1.00 | Yellow | Do. |
| 3 | +0.1% PbO | 0.25 | Blue | Do. |
| 4 | +0.05% PbO | 0.25 | ....do...... | Do. |
| 5 | +0.25% PbO | 0.25 | ....do...... | Do. |
| 6 | Rb:$K_2O$ modified [1] | 0.25 | Green | Do. |

[1] In glass No. 6, $Rb_2O$ replaced the $K_2O$; and, $K_2O$ replaced the $Na_2O$. Therefore, the composition was as follows:

| Ingredient: | Percent |
|---|---|
| $SiO_2$ | 63.93 |
| $Al_2O_3$ | 1.55 |
| BaO | 17.28 |
| $K_2O$ | 4.56 |
| $Rb_2O$ | 10.48 |
| $B_2O_3$ | 2.18 |

These runs illustrate a principle of the invention that a high alkali glass will produce two colors of photoluminescent output when the glass is melted under a low partial pressure of oxygen.

Runs 3, 4 and 5 show that lead oxide can be used to provide blue luminescence with short wave ultraviolet.

Example X.—High melting magnesia-alumina-silica glass

The glass used in this run was a high melting magnesia-alumina-silica glass of the following composition:

| Ingredient: | Percent |
|---|---|
| $SiO_2$ | 61.00 |
| $Al_2O_3$ | 18.50 |
| MgO | 20.50 |

The glass was melted in an electric furnace under oxidizing under oxidizing conditions, meaning 20% excess oxygen in the atmosphere above the melt. To the batch was added 0.25% $Sm_2O_3$. The temeperature of the melt was 2900° F. and, therefore, thermal reduction was effective to reduce some of the $Sm_2O_3$ to the $Sm^{+2}$ state. Luminescent output results were as follows:

| Short Wave Ultraviolet | Long Wave Ultraviolet |
|---|---|
| Blue | Orange |

This run illustrates a principle of the invention that a low alkali glass will produce two colors of photoluminescent output with less than 1% of samarium content.

Example XI.—Cabal glass

The base glass used in this series of runs was a Cabal glass (alkali-free) of the following typical composition:

| Ingredient: | Percent |
|---|---|
| $Al_2O_3$ | 15.00 |
| CaO | 29.69 |
| $B_2O_3$ | 55.31 |

The glass for each run was melted in either a gas-fired furnace under reducing conditions, meaning 1%–2% deficiency of oxygen in the combustion atmosphere above the melt; or, in an electric furnace under oxidizing conditions, meaning 20% excess oxygen (air) in the atmosphere above the melt. To the batch was added varying amounts of $Sm_2O_3$. In each instance the melting conditions were effective to reduce some of the $Sm_2O_3$ to the $Sm^{+2}$ state. In case of the electric furnace, the melting temperature was effective to produce thermal reduction of part of the $Sm_2O_3$ to the $Sm^{+2}$ state. Luminescent output results are set forth below:

| Glass No. | Melting conditions | Percent $Sm_2O_3$ | Short wave UV | Long wave UV |
|---|---|---|---|---|
| 1 | Gas furnace, reducing | 0.10 | Blue | Orange. |
| 2 | Electric, thermal reducing | 0.50 | ..do.. | Do. |

These runs illustrate a principle of the invention that a low alkali glass will produce two colors of photoluminescent output with less than 1% of samarium content.

Example XII.—"R-6" tubing glass

The base glass used in this run was an "R-6" tubing glass of the following typical composition:

| Ingredient: | Percent |
|---|---|
| $SiO_2$ | 67.69 |
| $Al_2O_3$ | 2.93 |
| CaO | 5.64 |
| MgO | 3.86 |
| BaO | 1.93 |
| $Na_2O$ | 15.92 |
| $K_2O$ | .57 |
| $B_2O_3$ | 1.45 |

The glass was melted in a gas-fired furnace under reducing conditions, meaning 1%–2% deficiency of oxygen in the combustion atmosphere above the melt. To the batch was added 0.25% $Sm_2O_3$. Luminescent output results are set forth below:

| Short Wave Ultraviolet | Long Wave Ultraviolet |
|---|---|
| Green | Orange |

This run illustrates a principle of the invention that a high alkali glass will produce two colors of photoluminescent output when the glass is melted under a low partial pressure of oxygen.

Example XIII.—Zinc crown glass

The base glass in this run was a zinc crown glass of the following typical composition:

| Ingredient: | Percent |
|---|---|
| $SiO_2$ | 63.93 |
| $Al_2O_3$ | 1.55 |
| ZnO | 17.28 |
| $Na_2O$ | 4.57 |
| $K_2O$ | 10.50 |
| $B_2O_3$ | 2.18 |

The glass was melted in a gas-fired furnace under reducing conditions, meaning 1%–2% deficiency of oxygen in the combustion atmosphere above the melt. To the batch was added 0.25% $Sm_2O_3$. Luminescent output results are set forth below:

| Short Wave Ultraviolet | Long Wave Ultraviolet |
|---|---|
| Green | Orange |

This run illustrates a principle of the invention that a high alkali glass will produce two colors of photoluminescent output when the glass is melted under a low partial pressure of oxygen.

SUMMARY

A summary of the results of the foregoing examples are set forth in the following tabulation:

| Glass No. and Reference | Melting conditions | Percent $Sm_2O_3$ | Short wave UV | Long wave UV |
|---|---|---|---|---|
| Prior Art: | | | | |
| I-1: $Na_2O \cdot 2 SiO_2$ | Thermal reduction-electric | 0.25 | Nil | Orange. |
| I-2: $Na_2O \cdot 3 SiO_2$ | do | 0.25 | do | Do. |
| I-3: $Na_2O \cdot 4 SiO_2$ | do | 0.25 | do | Do. |
| I-4: $Na_2O \cdot 6 SiO_2$ | do | 0.25 | do | Do. |
| I-5: $Na_2O \cdot 8 SiO_2$ | do | 0.25 | do | Do. |
| I-6: TM5 | do | 0.25 | do | Do. |
| I-7: TM7 | do | 0.25 | do | Do. |
| I-8: $K_2O \cdot 4 SiO_2$ | do | 0.25 | do | Do. |
| I-9: $Rb_2O \cdot 4 SiO_2$ | do | 0.25 | do | Do. |
| I-10: $Cs_2O \cdot 4 SiO_2$ | do | 0.25 | do | Do. |
| Present Invention: | | | | |
| Example II.—Magnesia-alumina-silica | do | .05 | Blue | Do. |
| Example III.—Soda-lime-silica: | | | | |
| III-1 | Reducing—Gas | .05 | Green | Do. |
| III-2 | Relatively Reducing—Gas | .05 | do | Do. |
| III-3 | Reducing—Gas | .25 | Pale green | Do. |
| III-4 | do | .25 | do | Do. |
| III-5 | Relatively Reducing—Gas | .25 | do | Do. |
| III-6 | do | .25 | Green | Do. |
| III-7 | do | 1.00 | do | Do. |
| III-8 | Reducing—Gas | 3.00 | Yellow | Do. |
| Example IV.—Soda-lime-silica with graphite | Reducing—(Chemical)—Gas | .01 | Green | Pale orange. |
| Example V.—Zinc-soda-alumina-silica: | | | | |
| V-1 | Reducing—(chemical) electric—graphite. | .25 | do | Orange. |
| V-2 | do | 1.00 | Pale green | Do. |
| Example VI.—Lithia-magnesia-aluminia-silica: | | | | |
| VI-1 | do | .25 | Blue | Do. |
| VI-2 | Thermal reduction—electric | .25 | Yellow | Do. |
| VI-3 +5% PbO | do | .25 | Blue | Do. |
| Example VII.—Low soda-magnesia alumina-silica | do | .25 | do | Do. |
| Example VIII.—KG33 borosilicate: | | | | |
| VIII-1 | Reducing—gas | .25 | Green | Do. |
| VIII-2 | Thermal reduction—electric | .25 | Blue-green | Do. |
| Example IX.—Barium crown: | | | | |
| IX-1 | Reducing—gas | .25 | Faint blue-green | Do. |
| IX-2 | do | 1.00 | Yellow | Do. |
| IX-3 +0.1% PbO | do | .25 | Blue | Do. |
| IX-4 +0.5% PbO | do | .25 | do | Do. |
| IX-5 +.25% PbO | do | .25 | do | Do. |
| IX-6 Rb:$K_2O$ modified | do | .25 | Green | Do. |
| Example X.—High melting magnesia-alumina-silica | Thermal reduction—electric | .25 | Blue | Do. |
| Example XI.—Cabal-alkali-free: | | | | |
| XI-1 | Reducing—gas | .10 | do | Do. |
| XI-2 | Thermal reduction—electric | .50 | do | Do. |
| Example XII.—"R-6" tubing | Reducing—gas | .25 | Green | Do. |
| Example XIII.—Zinc crown | do | .25 | do | Do. |

It is believed by the inventors that melting the glass under reducing conditions in accordance with this invention results in a luminescent, divalent species of samarium. However, the inventors present this merely as a theory without prejudice.

It will be obvious that some very difinite trends are established in the foregoing summary of data. Thus, in high alkali glasses of the prior art, even though the glass is melted under thermally reducing conditions, if there is a substantial partial pressure of oxygen, the $Sm_2O_3$ is retained in the $Sm^{+3}$ state. This produces no susceptibility to short wave activation and maintains the standard orange output of long wave activation.

By contrast, two outputs are produced in all cases in accordance with the present invention. In the lower alkali glasses, meaning about 5% or less of $R_2O$ alkali (alkali metal oxide), with less than 1% samarium, two outputs are always produced under either thermal reduction or relatively reducing gas-fired furnace conditions. Examples of these glasses are: the magnesia-alumina-silica glass in Example II; the lithia-magnesia-alumina-silica glass in Example VI; the low soda-magnesia-alumina-silica glass in Example VII; even the relatively low alkali KG33 borosilicate glass of Example VIII; the high melting magnesia-alumina-silica glass of Example X; and, the Cabal glass of Example XI.

Further, in high alkali glasses, if the glass is melted under a low partial pressure of oxygen, this effect is produced; or, the effect can be produced in the presence of chemical reductants, such as graphite. From the above tabulation, high alkali glasses under relatively reducing conditions are the soda-lime-silica glass of Example III having a high percentage of alkali; the soda-lime-silica glass, reduced by graphite, in Example IV, though melted in an electric furnace; zinc-soda-alumina-silica glass of Example V, reduced by graphite and melted in an electric furnace; the barium crown glass of Example IX, a high alkali glass, but melted under gas-fired reducing conditions; the "R-6" tubing glass of Example XII; and, the zinc crown glass of Example XIII.

The foregoing data, therefore, substantiate the following premises:

(1) A low alkali glass can be rendered "detecting" in a low alkali glass with less than 1% samarium content under thermal or chemical reducing conditions; and, (2) High alkali glasses can be rendered "detecting." If the glass is melted under a low partial pressure of oxygen, both states of the samarium are produced to provide a dual character in the glass. Further, chemical reductants are effective to produce this effect in high alkali glasses.

At this point it is to be understood that 1% excess air in a gas-fired furnace is relatively reducing as compared to 20% oxygen in the atmosphere of an electric furnace. However, when low alkali glasses are melted under electric furnace melting conditions, some of the samarium is apparently thermally reduced to the $Sm^{+2}$ state.

SUMMARY AND ADVANTAGES

The improvements provided by the glasses of the present invention include the following:

(1) "Detecting" glasses having a strong brilliant luminescence under all conditions, and encompassing a broad range of glasses, including low alkali glasses wherein less than 1% of samarium is utilized; and, (2) A novel process for producing "detecting" glasses in high alkali glasses, wherein the glass is melted under a low partial pressure of oxygen to produce the detecting effect; or, in the presence of chemical reductants which produce, in effect, low partial pressure of oxygen conditions.

An important advantage of glasses of this invention is their transparency.

Another important advantage is the improved maintenance factor of the glasses by virtue of the fact that they provide better resistance to deterioration.

A further advantage is the dual luminescence rendering the glasses "detecting" in character and capable of producing photoluminescent outputs under different wave lengths of ultraviolet light and producing colors from blue, to blue-green, to green, to pale green, to yellow, thus encompassing a substantial range of color outputs.

A further advantage is the brightness of these glasses under all conditions.

A still further important aspect and advantage of the invention is that the color output on the short wave end can be modified in a controlled manner by the amount of the assumed $Sm^{+2}$ which is produced in the glass.

The unique contribution to the art is provided by a broad spectrum of glasses, making it possible to produce detecting devices, fluorescent lighting tubes, luminous markers, signs, dials and many other devices having a brighter spectral output and utilizing a greater percentage of the ultraviolet, both long and short waves, from a given source.

In accordance with the present invention, a substantial advance has been provided to the art by overcoming problems relating to phosphors. Phosphors are notoriously sensitive to impurities and by the present invention transparent glasses are produced wherein the impurity factor is minimized in favor of a controlled reduction of at least part of the samarium content to the assumed $Sm^{+2}$ state to provide a novel "detecting" character in the glass. In accordance with the invention, therefore, transparent luminescent glass materials are provided. These are particularly adapted for use as targets in a broad range of devices to produce luminescent emissions from excitation energy such as photon radiation, exemplified by ultraviolet rays or the like.

A further advantage provided by the present invention is the improved workability of the luminescent products. Thus, the invention provides better workability in silicate based glass compositions that are luminescent.

Within the scope of the invention, luminescent device means any apparatus in which energizing radiation is converted into luminescent emissions. Photoluminescent device means any apparatus in which energizing radiation is converted into luminescent emissions. Photoluminescent device refers to any luminescent device in which the energizing agent is photon radiation.

It will be understood that modifications of this invention can be made without departing from the spirit and scope of this disclosure or the scope of the following claims.

THE PRIOR ART

No prior art is known relating to "detecting" glasses having the two valent states of samarium therein.

We claim:

1. A process of preparing a glass having varying colors of luminescent output with varying wave lengths of excitation radiation which comprises melting a glass of the following composition under reducing conditions in the presence of a small effective amount of samarium luminescence activator so that at least a part of the samarium is reduced to the divalent state:

| Ingredient: | Weight percent |
|---|---|
| $SiO_2$ | 61.00 |
| $Al_2O_3$ | 18.50 |
| MgO | 20.50 |

2. The invention according to claim 1 wherein the small effective amount of samarium is about .05% to .25% based on the total weight of the glass composition.

3. A luminescent glass including a vitrified base glass of the following composition:

| Ingredient: | Weight percent |
|---|---|
| $SiO_2$ | 61.00 |
| $Al_2O_3$ | 18.50 |
| MgO | 20.50 | and a small effective amount of samarium as the luminescent activator, wherein part of the samarium is present in the $Sm^{+3}$ state and part of the samarium is present in the $Sm^{+2}$ state, rendering the glass detecting to different wave lengths of ultraviolet light.

4. The invention according to claim 3 wherein the small effective amount of samarium is about .05% to .25% based on the total weight of the glass composition.

References Cited

Karapetyan, Luminescence of Glasses With Rare Earth Activators, Academy of Sciences U.S.S.R. Bulletin Physical Sciences, vol. 27, No. 6, 1963, pp. 791–94.

Pringsheim, Fluorescence and Phosphorescence, 1949, p. 478.

TOBIAS E. LEVOW, Primary Examiner

R. D. EDWARDS, Assistant Examiner

U.S. Cl. X.R.

106—52